June 13, 1950 M. TROPPER 2,511,308
SWIVEL JOINT ASSEMBLY
Filed Sept. 3, 1947
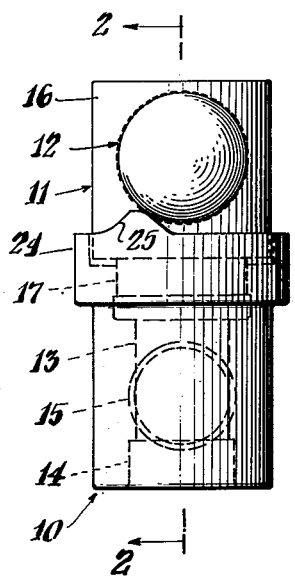
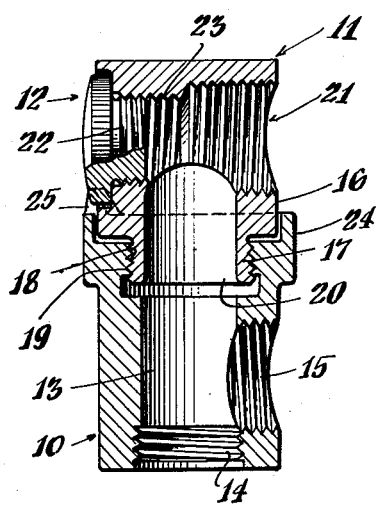
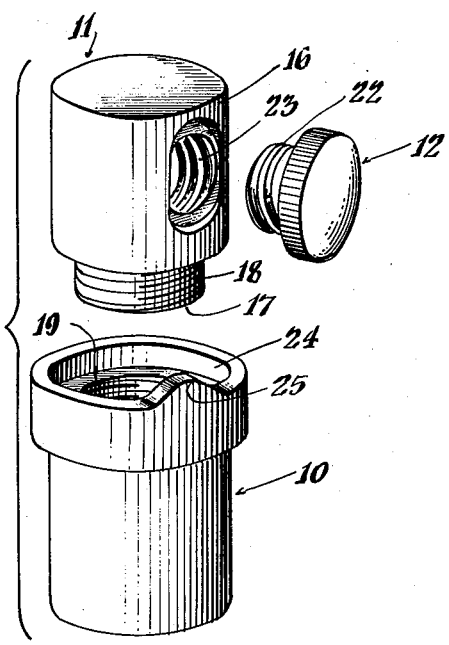
INVENTOR.
Moses Tropper
BY William H. Purzner
ATTORNEY Patented June 13, 1950

2,511,308

UNITED STATES PATENT OFFICE 2,511,308

SWIVEL-JOINT ASSEMBLY

Moses Tropper, Forest Hills, N. Y.

Application September 3, 1947, Serial No. 771,901

4 Claims. (Cl. 285—96.1)

This invention relates to swivel-joint assemblies, and, more particularly, to a form having normal relative movement between the housing members slightly less than 360 degrees.

The principal object of this invention is to provide in a device of the character described, an assembly which is extremely simple in construction, economical to manufacture, sturdy, and which will readily lend itself to mass production and assembly by unskilled labor.

A further object of this invention is to provide a device of the character stated above which has a minimum of parts.

A still further object of this invention is to provide a swivel-joint assembly in which the one cooperating stop member also serves to provide a removable closure to an aperture in the housing to permit ready access to the housing interior.

Numerous other objects of this invention will be readily apparent from a consideration of the following specification taken in conjunction with the accompanying drawings in which:

Fig. 1 is a front elevation of a form of device embodying my invention;

Fig. 2 is a sectional view on the line 2—2 of Fig. 1 except for the stop member 12 which is partially in side elevation and partially broken away to show a partial section also on the said line 2—2; and, Fig. 3 is a perspective view of the said form of device as illustrated in Figs. 1 and 2.

Referring more particularly to the drawings, it will be seen that 10 represents generally the one housing member and 11 the other housing member, while 12 indicates generally the removable stop member.

The housing member 10 will preferably be substantially cylindrical externally, with a bore 13 extending longitudinally therethrough substantially concentric to the longitudinal axis of the housing member 10. Threads 14 or other suitable means may be provided for application of the device to a lamp standard or the like, and, where desired, one or more additional apertures 15 may be provided extending transversely with respect to the longitudinal axis of the housing member 10 to provide means for attaching lamp arms or brackets and the like or to provide access means to the interior of the housing member, for example, to serve as an aid in wiring a lamp.

The housing member 11 will also preferably be substantially cylindrical externally, and preferably formed with a main portion 16 and a reduced portion 17. Threads 18 are provided upon the housing member 11 (and where this housing member has a reduced portion as illustrated, such as 17, these threads 18 will be upon the reduced portion) which threads 18 are engageable threadedly with the cooperating threads 19 of housing member 10 to permit relative rotational movement between the housing members 10 and 11 upon their respective threads 19 and 18.

In assembling the unit, the one housing member 11 is positioned adjacent to the other housing member 10 in longitudinal alignment therewith and then brought into threaded engagement therewith by means of the cooperating threads 18 and 19.

A bore 20 of substantially the same size as bore 13 extends longitudinally substantially throughout the length of the housing member 11 and substantially concentric to the longitudinal axis thereof, and, when the housing members are assembled, this bore 20 is substantially in longitudinal alignment with the bore 13 of housing member 10.

Another bore 21 is provided extending through the housing member 11 transversely with respect to the longitudinal axis thereof and bore 20 and communicating with the latter.

The stop member 12 may be inserted in this transverse bore 21 so as to project therefrom and also to serve as a closure therefor. This stop member 12 may have threads 22 to engage with corresponding threads 23 in the bore 21 for securing the stop member 12 in position.

A substantially annular collar 24 is provided concentric to the rotational axis of housing members 10 and 11 extending longitudinally beyond the main portion of housing member 10 to surround the main portion 16 of the housing member 11 adjacent the reduced portion 17 for the purposes more fully hereinafter explained.

A stop is provided on the housing member 10 to cooperate with the stop member 12 of housing member 11. This stop member 25 on the annular collar 24 projects sufficiently to engage the projecting portion of stop member 12 when the latter has been inserted into the member 11 after the housing members have been assembled in threaded engagement with each other as described hereinabove. In practice, the housing members will be left free to rotate upon their respective threads 18 and 19 but once the stop member 12 has been inserted into housing member 11, this rotation will be limited to less than one complete turn or rotation of 360 degrees, and, since it is contemplated that the housing members will be threadedly engaged with each other to the extent of several turns, it is apparent that rotation less than a complete turn will not longitudinally disengage the housing members one from the other.

Even limited rotational movement between the housing members 10 and 11 upon their respective threads will cause relative movement of the housing members 10 and 11 along their longitudinal axis. It is obvious that rotation upon their respective threads in a direction which would ultimately disengage the housing members 10 and 11 from each other at some point, will cause a spacing to occur between the end of the main portion 16 of the housing member 11 and the adjacent end of housing member 10, where the housing member 11 has a reduced portion, but it is intended that the annular collar 24 will extend longitudinally of housing member 11 sufficiently to normally cover this spacing when it occurs in the assembled unit.

It will be understood that this invention is not confined to the specific details shown and described, nor is the application of the invention herein disclosed confined merely to use as a swivel-joint assembly for lamps although particularly adapted thereto, and numerous changes and modifications and the full use of equivalents may be resorted to without departing from the spirit or scope of the appended claims.

What is claimed is:

1. In a device of the character described, a pair of housing members having cooperating threaded portions thereon whereby the one housing member may be freely rotated relative to the other thereof upon said cooperating threaded portions about a common axis, means on one of said housing members for covering the space between said housing members caused by relative rotational movement of the housing members upon their respective threaded portions, said means including an annular collar projecting from said one housing member concentric to the common rotational axis of said housing members and extending beyond the threaded portion of said other housing member to a point sufficient to cover the spacing caused by limited relative rotational and axial movement of said housing members, and inter-engaging means on said housing members providing for limited free rotational movement of the assembled housing members and preventing axial disengagement of the housing members one from the other.

2. In a device of the character described, a plurality of housing members, one of said members being threadedly engageable in another thereof and being freely rotatable relatively thereto, a member engaging one of said housing members and projecting therefrom, and a member on the other of said housing members adapted to engage said projecting member to provide for limited free relative rotational movement between the housing members.

3. In a device of the character described, a pair of housing members, one of said members having an internal threaded portion and the other of said members having an external threaded portion adapted to be threadedly engaged by said internal threaded portion, said housing members being relatively free to rotate clockwise and counter-clockwise between certain limits relative to each other about a common axis upon their respective threaded portions, a stud on one of said housing members, and a cooperating stop member on the other of said housing members for limiting free relative rotational movement of said housing members in each direction whereby to prevent axial disengagement of the one of said housing members from the other thereof and to prevent locking said members together upon their respective threads and to prevent complete relative rotational movement of the said housing members.

4. In a swivel-joint assembly of the character described, a pair of housing members, one of said housing members having a main portion and a reduced portion, threads on said reduced portion, the other of said housing members having an aperture therein to receive said reduced portion, threads on said apertured housing member for threadedly engaging the threads of said reduced portion whereby the said housing members may be secured together in position to move freely relatively with respect to each other upon said threads, and means extending substantially about the periphery of the apertured member at the aperture thereof for covering the axial spacing of the members caused by limited relative rotation of the members upon their respective threads, and a stop carried by each of the said housing members to provide limits between which the housing members are free to rotate and preventing rotation beyond these limits.

MOSES TROPPER.

REFERENCES CITED

The following references are of record in the file of this patent:

UNITED STATES PATENTS

| Number | Name | Date |
|---|---|---|
| 50,138 | Kaylor | Sept. 26, 1865 |
| 1,559,874 | Holland | Nov. 3, 1925 |
| 1,734,996 | Butler | Nov. 12, 1929 |
| 1,817,808 | Eaton | Aug. 4, 1931 |
| 2,017,187 | Steffen | Oct. 15, 1935 |
| 2,116,004 | Tear | May 3, 1938 |
| 2,250,495 | Miller | July 29, 1941 |
| 2,423,762 | Everett | July 8, 1947 |